United States Patent [19]

Hamilton et al.

[11] Patent Number: 5,421,899
[45] Date of Patent: * Jun. 6, 1995

[54] METHOD FOR CLEANING MANUFACTURING LUBRICANTS AND COOLANTS FROM METAL CONTAINERS

[75] Inventors: C. Richard Hamilton, Arvada; Ralph Z. Marsh; Russ Thompson, both of Golden, all of Colo.

[73] Assignee: Golden Technologies Company, Inc., Golden, Colo.

[*] Notice: The portion of the term of this patent subsequent to Sep. 28, 2010 has been disclaimed.

[21] Appl. No.: 914,050
[22] Filed: Jul. 13, 1992

Related U.S. Application Data

[63] Continuation of Ser. No. 624,140, Dec. 7, 1990, abandoned.

[51] Int. Cl.$^6$ .................. B08B 3/00; B08B 3/08
[52] U.S. Cl. .......................... 134/10; 134/26; 134/40
[58] Field of Search ............. 134/10, 2, 22.14, 22.19, 134/25.4, 26, 40; 252/162, 171, 174.2, DIG. 14; 413/1, 2, 8; 427/327, 353

[56] References Cited

U.S. PATENT DOCUMENTS

| | | | |
|---|---|---|---|
| Re. 29,649 | 5/1978 | Farnsworth | 252/171 |
| Re. 32,661 | 5/1988 | Binns | 252/142 |
| 2,711,978 | 6/1955 | Groom | 134/10 |
| 2,923,648 | 2/1960 | K'Burg | 134/12 |
| 3,023,144 | 2/1962 | Greathouse et al. | 514/164 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,136,217 | 1/1979 | Henley | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,452,264 | 6/1984 | Kreisel et al. | 134/58 |
| 4,477,290 | 10/1984 | Carroll et al. | 148/6 |
| 4,498,934 | 2/1985 | Potts | 134/254 |
| 4,506,533 | 3/1985 | Hessel et al. | 413/1 |
| 4,511,488 | 4/1985 | Matta | 252/162 |
| 4,537,640 | 8/1985 | Kreisel et al. | 134/18 |
| 4,540,505 | 9/1985 | Frazier | 252/106 |
| 4,599,116 | 7/1986 | King et al. | 134/2 |
| 4,615,744 | 10/1986 | Murtha | 134/25.2 |
| 4,620,937 | 11/1986 | Dellutri | 134/40 |
| 4,640,719 | 2/1987 | Hayes et al. | 134/42 |
| 4,654,089 | 3/1987 | Singelyn et al. | 134/26 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174.25 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,865,742 | 9/1989 | Falletti | 210/637 |
| 5,248,343 | 9/1993 | Hamilton et al. | 134/10 |

FOREIGN PATENT DOCUMENTS

| | | |
|---|---|---|
| 2636149 | 3/1977 | Germany . |
| 2713516 | 9/1978 | Germany . |
| 62-141100 | 6/1987 | Japan . |
| 1069698 | 3/1989 | Japan . |
| 1069699 | 3/1989 | Japan . |
| 1101399 | 4/1989 | Japan . |
| 1221309 | 9/1989 | Japan . |
| 1272700 | 10/1989 | Japan . |
| 1603047 | 5/1978 | United Kingdom . |
| 2026551 | 5/1978 | United Kingdom . |
| 2143254 | 2/1985 | United Kingdom . |

Primary Examiner—Richard O. Dean
Assistant Examiner—Saeed Chaudhry
Attorney, Agent, or Firm—Sheridan Ross & McIntosh

[57] ABSTRACT

A method for manufacturing metal containers using a cleaning agent having a substantially neutral pH is disclosed. Lubricants and coolants used during the container forming process are cleaned from the surface of metal containers by using a terpene cleaning agent comprising d-limonene, alpha-terpineol, beta-terpineol, alpha-pinene, beta-pinene, alcohols of such agents or mixtures thereof. Surfactants may also be used to aid in the cleaning process. The organic component of the cleaning agent, as well as lubricants, coolants and aqueous components, are separated for recycling and re-use.

34 Claims, 3 Drawing Sheets

METHOD FOR CLEANING MANUFACTURING LUBRICANTS AND COOLANTS FROM METAL CONTAINERS

This is a continuation of application Ser. No. 07/624,140, filed on Dec. 7, 1990, now abandoned.

FIELD OF THE INVENTION

This invention relates to the cleaning of lubricants and coolants from metal containers used in the manufacturing of such containers and to the recycling of cleaning agents, lubricants, coolants, and water used in such manufacturing process.

BACKGROUND OF THE INVENTION

In the manufacture of metal containers, such as beverage containers, metal blanks are stamped and then formed by drawing and ironing, drawing and redrawing or other forming processes the blanks into a desired container conformation and finally decorated. During the forming process, lubricants and coolants are deposited on the metal surfaces. Residual quantities of lubricants and coolants must be removed from the surface of the metal prior to painting, coating, decorating or packaging the finished metal product.

Currently, the industry uses cleaning agents consisting of either relatively strong acid or caustic solutions. Primarily, strong acid solutions consisting of hydrofluoric, sulfuric, phosphoric, nitric, and similar acids are used. For example, U.S. Pat. No. Re. 32,661 to Binns discloses a method of cleaning aluminum using an acidic aqueous cleaning solution having a pH less than 2. Similarly, U.S. Pat. No. 3,969,135 to King discloses a composition and process for cleaning aluminum using a low temperature aqueous acidic solution with a pH of less than 2. Typically, acid or caustic cleaning solutions are rinsed from containers with water.

While the use of acidic and caustic solutions to clean metal is effective to remove oils, such use presents multiple problems in the treatment of used cleaning and rinse solutions, as well as negative effects on the appearance and integrity of the containers. Specifically, used acid or caustic cleaning agents require neutralization prior to their discharge. Several disadvantages are encountered in such neutralization, including the cost of the materials and the handling problems associated with such toxic chemicals. The corrosive nature of acid and caustic cleaning solutions also damages processing equipment used in the cleaning of metal containers.

Methods for cleaning metal containers with acidic or caustic solutions also makes the recycling of the cleaning agent, lubricants, coolants and aqueous factions of the process extremely difficult. Once mixed with rinse water, acidic and caustic cleaning agents are not readily recoverable. Therefore, as discussed above, such mixtures must be treated in a manner that permits their ecological disposal or release. The prior art does not teach an economical method of treating conventional cleaning agents, lubricants, coolants or water used in typical processes.

Further, the acidic cleaning agents currently in use etch the metal surfaces of containers being cleaned, creating grooves and gouges in the metal surface and thereby, producing waste solutions with dissolved metal fines. These metal fines create waste disposal problems.

Acidic etching can also damage containers by creating or enlarging pin-sized holes or gouges in the containers to make "pinhole leakers", making such containers unusable. For example, during drawing and ironing procedures, manganese-iron particle complexes in aluminum can create such holes or gouges. Acidic cleaning agents deepen such holes and gouges, which in turn reduces the reflectivity of the metal surface and creates problems in the adherence of paint to the metal surface. The prior art also teaches the use of active fluoride solutions to assist in the dissolution of aluminum fines from metal surfaces. Fluoride components accelerate attack upon metal surfaces in order to remove metallic particles resulting from the forming operation. Excessive fluoride levels are known to result in the etching of metallic surfaces and contribute to the disposal problems encountered by container manufacturers.

In view of the above, a need exists for a new method for manufacturing metal containers. The present invention addresses this need by providing a method for manufacturing metal containers using a cleaning agent having a substantially neutral pH capable of removing lubricants and coolants and by providing an economical method of recycling the cleaning agent, lubricants, coolants and water used in the process, without the problems associated with conventional acidic and caustic cleaning solutions.

SUMMARY OF THE INVENTION

The present invention includes a method for manufacturing metal containers in which a cleaning agent having a substantially neutral pH is used to remove lubricants and coolants applied during the manufacture of metal containers. More specifically, the pH can range between about 6 and about 9. In one embodiment, the cleaning agent includes, as an active agent, a terpene or more specifically, d-limonene, alpha-terpineol, beta-terpineol, alpha-pinene, beta-pinene, alcohols of these compounds, or mixtures thereof.

In another embodiment of the invention, the cleaning agent is applied in conjunction with a surfactant to assist in emulsifying lubricants and coolants and in the rapid wetting of the surface of metal containers to facilitate the removal of lubricants and coolants. The present process can further include removing the cleaning agent of the present invention, together with lubricants and coolants, by successively rinsing the metal containers with water. The present process can also further include separating the active agent of the cleaning agent, lubricants, coolants and water so that such components are then available for re-use.

DETAILED DESCRIPTION OF THE INVENTION

Figure 1:
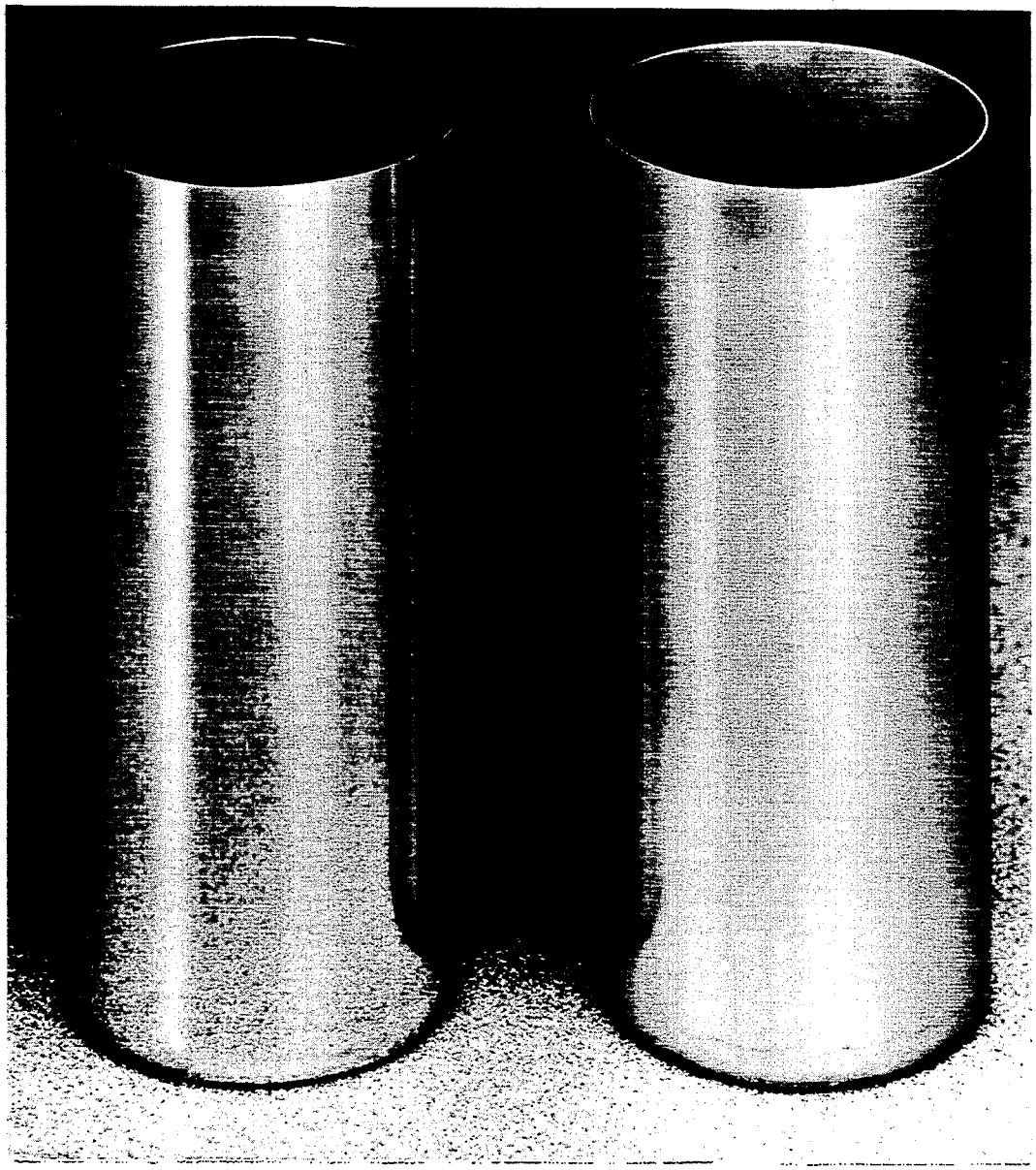
FIG. 1 is a photograph showing an aluminum container washed according to the present invention compared with an aluminum container washed by a standard acid wash

The present invention includes a process for cleaning lubricants, coolants and metal fines from metal containers and/or from metal used in making metal containers by contacting a substantially neutral pH cleaning agent to the surface of metal containers and/or said metal during the manufacturing process. References made herein to metal containers should be understood to include, to the extent possible, metal used in making metal containers. For example, coil stock is sometimes cleaned prior to formation into metal containers. References to coil stock should be understood to include any flat metal capable of use in container formation, regardless of whether such metal is coiled. As used herein, the term metal refers to any metal suitable for use in the manufacture of metal containers. Such metals include, but are not limited to, aluminum, steel, copper, brass and alloys thereof. The term container, as used herein, refers, but is not limited, to beer cans, beverage cans, food containers, and other containers such as aerosol cans and oil filters. The term container also refers to "two piece" cans, i.e. cans in which the sides and bottom are formed from one piece of metal and the top is a second piece, and to "three piece" cans which are formed from three separate top, bottom and side pieces.

The present invention, as generally described above and more specifically described below, has a number of attendant advantages over the prior art. Use of a substantially neutral pH cleaning agent allows for the removal of lubricants and coolants from metal surfaces without the attendant etching associated with conventional cleaning agents. In the absence of etching, the metal surface of a container is smoother than metal surfaces treated with acidic or caustic solutions. The smooth quality of such metal containers enhances the light reflective qualities of the metal surface and allows for better adherence of ink or paint on the surfaces of metal containers. Moreover, reduced etching results in fewer holes in containers.

A further advantage of the present invention is that use of a substantially neutral pH cleaning agent allows for easy recycling of rinse water, lubricants, coolants and active agents in cleaning agents because such lubricants, coolants, and active agents are typically not water miscible and therefore, readily separate from rinse water.

A further advantage of the present invention is the elimination of dangerous acidic or caustic solutions that pose serious risks to employees performing metal container cleaning methods. Moreover, the acidic solutions utilized in the prior art are relatively expensive. The present invention utilizes cleaning agents that are less expensive than traditional acidic cleaning agents.

In the formation of metal coil stock for making metal containers and the formation of metal containers from coil stock, metal is frequently contacted with a number of compositions to lubricate the surface of the metal and to reduce the temperature of the metal. Typically, such lubricants and coolants are oil-based and therefore cannot be readily removed with water. Lubricants can include both petroleum-based lubricants and synthetic lubricants, which are typically made of esters, diesters and/or fatty acids. Lubricants commonly include about 25% organic components and about 75% water. Lubricants used in conventional processes include cutting oils, mill oils, anti-rust oils and silicon based oils. Coolants also include a petroleum-based and/or a synthetic organic component. Such an organic component, however, is most typically present in amounts of about 5%. Lubricants and coolants are typically provided in formulations which can include rust inhibitors, biocides, stabilizing compounds, anti-oxidants and other ancillary components. As used herein, the term lubricants and coolants refers to any composition having an oil-based component applied to metal containers or metal used for making metal containers.

The cleaning agent of the present invention effectively cleans lubricants, coolants and other compounds found on metal containers during the manufacturing process and has a substantially neutral pH. Substantially neutral pH refers to solutions which, given particular concentrations, amounts and cleaning times, do not cause readily detectable etching of a container's surface. More particularly, substantially neutral pH refers to solutions having a pH of between about 6 and about 9, more preferably between about 6 and about 8, and most preferably between about 6.5 and about 7.5.

In a further embodiment of the present invention, the active agent of the cleaning agent is hydrophobic. In this manner, upon application to and rinsing from metal containers, the active agent of the cleaning agent can be readily separated from water and recycled for further use.

In a further preferred embodiment, the cleaning agent comprises, as an active agent, an effective amount of a terpene for particular cleaning application. Terpenes have the general chemical formula of $C_{10}H_6$ and are based on the isoprene unit $C_5H_8$. Preferred terpene compositions of the present invention include d-limonene, alpha-terpineol, beta-terpineol, alpha-pinene, beta-pinene, alcohols of such compositions, or mixtures thereof.

The concentration of an active agent, such as a terpene, in the cleaning agent used in a particular case depends upon the amount and type of lubricants and coolants being removed, the method of application of the cleaning agent, the time required in the particular process, and various other factors. In a preferred embodiment of the cleaning agent, the active agent is in an aqueous solution at concentrations from about 2% to about 40%, more preferably from about 5% to about 30% and most preferably from about 10% to about 25%.

In one embodiment of the invention, surfactants are used in conjunction with the cleaning agent to facilitate rapid wetting of the surface of the metal containers and for emulsification of organic components of a formulation. Surfactants may be added to the cleaning agent to enhance the solubility of the active agent in the aqueous medium, or they can be separately contacted to the metal containers. Any suitable surfactant or mixtures of surfactants can be used and can be of the non-ionic, anionic, cationic or amphoteric type, and of natural or synthetic origin. Suitable surfactants for use in the present invention include, but are not limited to, nonylphenol, alkanolamide, (nonylphenoxy)polyethylene oxide, sodium salts of petroleum sulfonic acid, sorbitan sesquioleate and mixtures thereof. Specific suitable surfactants include Tergitol NP-7 sold by Union Carbide Corporation and WRS-1-66 sold by Cyclo-Corporation of Miami, Fla.

The concentration of surfactant used depends upon whether the surfactant is used in conjunction with or separately from the cleaning agent and upon other factors such as the strength of the cleaning agent and the amount and volume of lubricants and coolants being removed.

In a preferred embodiment using a surfactant, the surfactant Tergitol NP-7 is present in a concentration of about 3% by volume to about 12% by volume, more preferably about 4% by volume to about 8% by volume and WRS-1-66 is present in a concentration of about 0.5 to about 2.

Any conventional technique may be employed to contact the cleaning agent and/or surfactants with the container surface to be cleaned. Contacting such components to a metal container may thus be accomplished by spraying, showering or immersing of the metal container.

In a preferred embodiment of the present invention, metal containers are cleaned as part of a continuous process for stamping, forming, ironing, doming, cleaning and decorating metal containers. Such a continuous process can include, for example, stamping a circular piece of aluminum from a roll of sheet aluminum and forming the circular piece into a cup-like configuration. The process further includes elongating the container sides by use of one or more ironing dies to form the container to a desired height and final configuration. The bottom of the container can be domed to produce a concave bottom surface of the final container. The containers are then cleaned, for example, by the present process, to remove lubricants and coolants applied to the container during the forming process. The cleaned containers can then be decorated by various known printing techniques. Such containers can then be filled, for example, with beer, beverages or foods and sealed with a top.

The present invention includes the cleaning of metal containers in the above-described container production process in a washer by spraying the cleaning agent and any surfactants of the present invention on the metal containers as they are conveyed past spray heads. For example, containers can be conveyed on a large mesh conveyor, in an open end down manner, with sprays directed from the top and bottom so that sprays contact all surfaces of the container.

Figure 4:
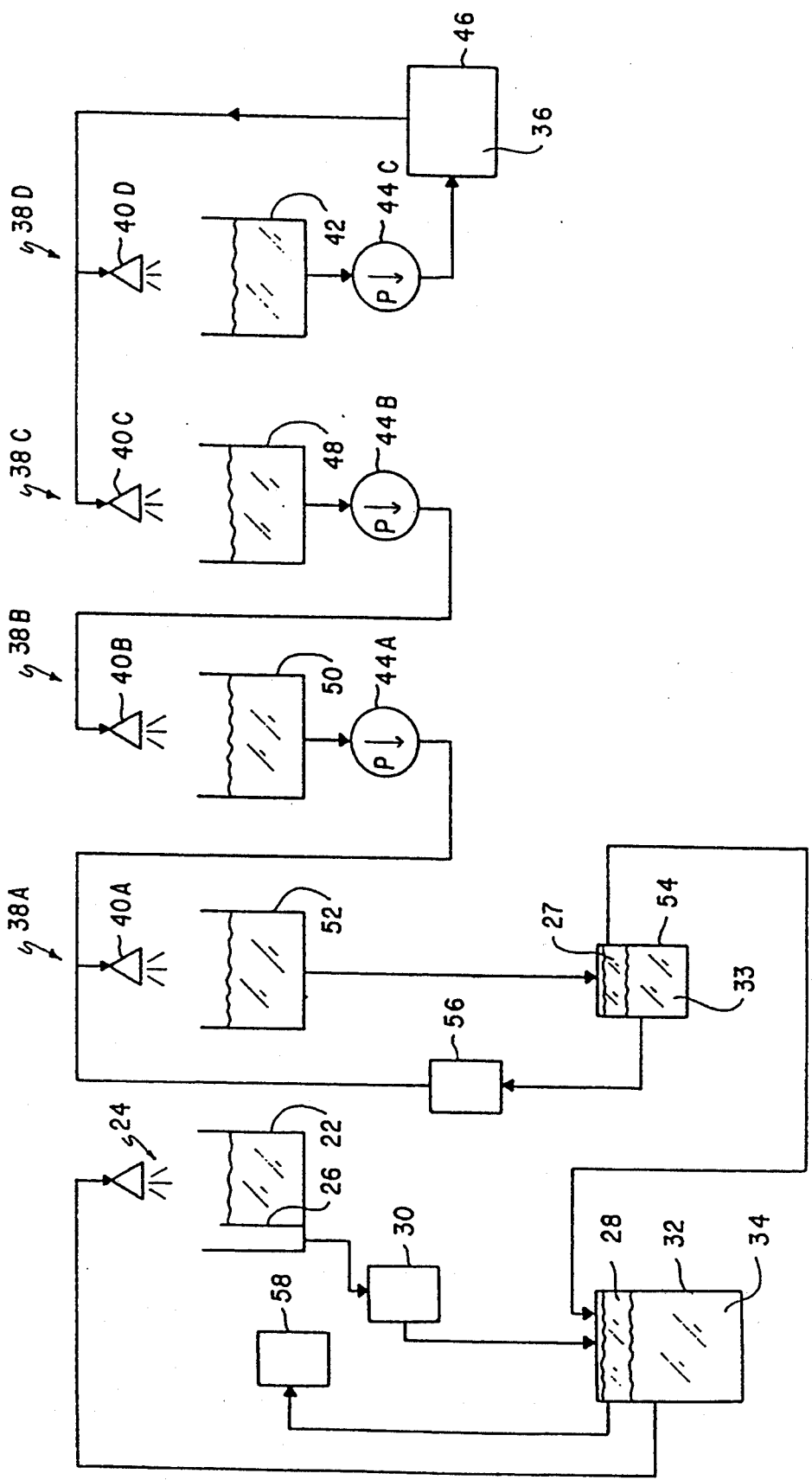
FIG. 4 is a schematic flow diagram showing the spray application of cleaning agent and rinse water and the flow of fluids throughout the washing, rinsing and reclaim stages of the present invention.

Referring to FIG. 4, in one embodiment of the invention, metal containers (not shown) having lubricants and coolants on their surfaces are conveyed above a washer reservoir 22 and are sprayed with a solution 24 containing the cleaning agent and surfactant. The lubricants and coolants 28 removed from the containers during spraying are collected in the washer reservoir 22, along with the water, cleaning agent and surfactant solution 24. The washer reservoir 22 is provided with a weir 26 that allows lubricants and coolants, cleaning agents, surfactants and water to spill over and be conducted through a filter 30 to remove foreign solid material washed off metal containers prior to being directed to a separator tank 32. In the separator tank 32, lubricants and coolants 28 are allowed to separate from an aqueous cleansing solution 34 comprising cleaning agent, surfactant, and water. After separation from the lubricants and coolants 28 in the separator tank 32, the aqueous cleansing solution 34 is then reused in the above-described spraying process to remove further lubricants and coolants 28 from additional metal containers. The present invention thus provides for an essentially closed loop with respect to the aqueous cleaning solution 34. Addition of water, cleaning agents and surfactant to the washer reservoir 22 is only necessary to replenish that loss caused by evaporation and by adherence of solution to metal containers being conveyed through the washing process.

The phase of the solution primarily comprising lubricants and coolants 28 that separates from the aqueous cleansing solution 34 while in the separator tank 32 can be directed to a clarifier 58 for further separation. The lubricants and coolants can then be reused in the metal container manufacturing operation or disposed of.

After being conveyed through the washer reservoir 22, the metal containers are then further conveyed through successive rinse stages 38 A, B, C and D where they are repeatedly sprayed with water to remove remaining traces of cleaning agent, surfactants, lubricants and coolants, present on the metal containers. A preferred embodiment of the rinsing process includes four rinsing stages 38 A, B, C and D. Metal containers are rinsed successively by each of the four stages. Rinse water is cycled through the first three 38 A, B, C of the four stages for reuse in prior rinse stages. Clean deionized water 36 is used as rinse water in the fourth and final rinse stage 38D, to remove all remaining traces of the above-identified components as well as minerals found in plant process water.

For ease of explanation, the following description of the rinsing process begins with the final stage 38D of the rinsing process and subsequently discusses the other three prior rinse stages 38 A, B, and C in order to correspond to the direction of the flow of water in the process, which is opposite to the direction in which containers are conveyed. In the fourth rinse stage 38D, metal containers are sprayed with deionized water 36 directed through spray heads 40D to remove any last traces of lubricants, coolants, cleaning agent and water. The rinse water from the fourth rinse stage 38D is collected in a fourth stage reservoir 42. The rinse water from the fourth stage 38D is reused by directing it from the fourth stage reservoir 42, through a pump 44C and then through a deionizer 46 for further use in the fourth stage rinse 38D. Deionized water 36 is thus regenerated without the necessity of continuously adding new deionized water from outside of the system. Water loss caused by evaporation or by the adherence of water to the metal containers exiting the fourth rinsing stage 38D is compensated for by the addition of relatively small amounts of additional deionized water 36.

In one embodiment, the rinse water used in the third rinse stage 38C is also deionized water 36. In this embodiment, deionized water 36 is directed from the deionizer 46 used in the fourth stage 38D to the third spray head 40C. Alternatively, tap water can be used as rinser water in the third stage (not shown). The rinse water from the third stage 38C is drained into the third stage reservoir 48, and subsequently conveyed by a pump 44B to the spray head 40B for the second stage rinse 38B.

After water is sprayed from the spray head 40B in the second stage rinse 38B, it drains into the second stage reservoir 50. Water is taken from the second stage reservoir 50 and subsequently conveyed to a pump 44A to the spray head 40A for the first rinse stage 38A. After water is sprayed from the spray head 40A in the first stage rinse 38A, it drains in to the first stage reservoir 52.

Water from the first stage rinse 38A is collected in the first stage reservoir 52 and is recycled for use as rinse water for the first rinse stage 38A. Thus, the first rinse stage 38A is supplied with rinse water from both the first 52 and second 50 stage reservoirs. Recycling of the first stage rinse water is accomplished by use of a separator reservoir 54. Rinse water from the first stage reservoir 52 is directed to the separator reservoir 54 to allow cleaning agents, surfactants, lubricants and coolants 28 to separate from the non-organic water phase 33 of the resulting rinse solution. The lubricants and coolants 28 can then be directed to the separator tank 32. The non-organic water phase 33 is conducted through a filter 56 to remove any remaining lubricants and coolants 28 and is then returned for further use in first stage rinsing 38A of additional metal containers. Thus, in one embodiment of the invention, the water used in the washer reservoir 22 and the water used in the rinsing process, is continuously recycled for use in the cleaning and rinsing of metal containers. The only additional water supplied to the system is deionized water 36 furnished from outside the system.

In another embodiment of the invention, water can be drained from the system at approximately the same rate at which deionized water is introduced to the rinse system to maintain relatively constant levels in each reservoir.

The combined flow rate of rinse water in the four rinse stages 38 A,B, and C is sufficient to completely rinse cleaning agent, surfactants, lubricants and coolants, from the metal containers. Preferably, the amount of water used in each stage is kept to a minimum in order to conserve water while at the same time thoroughly rinsing the metal containers.

After the third rinsing stage 38C, all cleaning agent, surfactants, lubricants and coolants are rinsed from the metal containers and only deionized or tap water is on the metal containers. The fourth rinsing stage 38D rinses all water from the metal containers with deionized water 36. An acceptable flow rate and rinsing time in the fourth rinsing stage 38D to completely rinse water from the metal containers can be determined by experience. It should be appreciated that while use of various volumes of rinsing water may be used, the minimum amount of water necessary to obtain complete rinsing should be used to minimize process time and water use.

Between rinsing stages 38 A, B, C, D or after the final rinse 38D, blowers (not shown) can be used to blow residual water from containers. Containers can then be subsequently dried in ovens or other conventional drying or heating devices.

As discussed above in general and in further detail below, a further aspect of the present invention is the recycling of the various components of the rinses. The rinse water in the first rinse reservoir 52 has the greatest concentration of the cleaning agent, surfactants, lubricants and coolants washed from the metal containers. As discussed above, rinse water from the first rinse reservoir 52 is conducted to a separate rinse separator tank 54. In the rinse separator tank 54, the hydrophobic nature of an organic phase 27, comprising the active agent of the cleaning agent, surfactants, and any lubricants or coolants, makes these components of the rinse water separate from the non-organic water phase 33 of the rinse water solution. The organic phase 27 can be directed from the rinse separator tank 54 to the separator tank 32, leaving the non-organic water phase 33 within the rinse separator tank 54. The non-organic water phase 33 can then be conducted from the rinse separator tank 54 through a filter 56 for reuse in the washing of additional metal containers.

A further embodiment of the invention relates to a method for cleaning metal surfaces, and in particular, surfaces of aluminum, steel, brass, copper or alloys thereof, by contacting metal surfaces to be cleaned with the above-described terpene cleaning agent and subsequently recovering and recycling the cleaning agent and rinse water. Lubricants and coolants present on the surface of the metal are effectively cleaned by contacting the terpene cleaning agent with the metal surface in an amount and concentration sufficient to clean the lubricants and coolants from the metal's surface. In a preferred embodiment, the cleaning agent is contacted to the metals by spraying the cleaning agent onto the metal surface. The resultant mixture of cleaning agent, lubricants and coolants, as well as any water present in the cleaning agent spray, are collected in a reservoir. Subsequently, the metal surface is rinsed with one or more stages of water and the rinse water is collected. The different components from the collected solutions are then separated from each other as discussed below, to form different components for reuse in the metal cleaning process. In particular, the non-organic and organic phase components can be separated, the cleaning agent can be separated from the lubricants and coolants, and the cleaning agent can then be reused in the further cleaning of metal surfaces.

Alternative methods for separating the various components can be used, such as subjecting the mixtures to electro-chemical coagulation, adding de-emulsifiers to the mixture, directing the mixture through oil absorbing filters, such as polypropylene filters, conducting the mixture through osmotic barriers, or mechanically skimming organic components from the surface of the mixture. In one embodiment of the invention, separation of oil based lubricants and coolants is facilitated by adjusting the composition of the cleaning agent solution. By increasing the organic component of the cleaning agent solution, lubricants and coolants can be removed from metal surfaces without emulsifying such lubricants and coolants, thus facilitating the later separation of the various components for recycling purposes. For example, an active agent composition comprising about 93 percent d-limonene, 6 percent Tergitol NP-7 and 1 percent WRS-1-66, facilitates the separation of oil based lubricants and coolants from the aqueous cleansing solution 34 because such a composition does not emulsify the oil based lubricants and coolants.

In another embodiment of the invention, de-emulsifying agents can be added to the cleaning agent/surfactant composition to aid in the separation of non-organic and organic factions after use and during recovery. Such de-emulsifying agents can be useful because the use of a strong or concentrated surfactant in the process makes separation of non-organic and organic phases more difficult. Suitable de-emulsifying agents include any de-emulsifiers known to those skilled in the art, such de-emulsifying agents being generally capable of neutralizing charges in order to stabilize dispersion, thus allowing organic phases to coalesce and separate from non-organic phases. In particular, the de-emulsifying agent compositions Mazon TM 77, 80 and 150 may be used in the process. Such agents can be used in concentrations necessary to obtain the desired separating effect in view of other process requirements. The non-organic water phase 33 separated from the organic phase 27, is also available for re-use and may be filtered 56 to remove solids and trace amounts of cleaning agent, lubricant and coolant 27. In one embodiment the filter 56 is made of a material, such as polypropylene, able to absorb organic substances. The filtered non-organic water phase is then returned for use in the rinse stages of the present invention, preferably in the stages prior to the final deionized water rinse 38D.

The following examples and test results are provided for purposes of illustration and are not intended to limit the scope of the invention.

Referring now to FIG. 1, cans washed with a standard acid wash are compared to cans washed according to the present invention. The cans washed in accordance with the present invention have a smoother surface with increased reflectivity as indicated by measurements of roughness. Table 1 below compares the average roughness of cans washed in accordance with the present invention and cans washed using a standard acid wash. Two aluminum cans were analyzed by a scanning electron microscope and a Rank Taylor Hobson Profilometer to determine the difference in surface roughness of the outside and inside diameters of each can. A 10 volume percent terpene composition wash was used in which the cleaning agent included 93 volume percent d-limonene, 6 volume percent NP-7 and 1 volume percent WRS-1-66. The cans were cleaned using the process described below in Example I. A roughness average is the universally recognized and most used international parameter of the roughness of a surface. A roughness average is the arithmetic mean of the departures of the profile line produced by a profilometer from the mean line.

$$Ra = 1/L_0 \int^L /y(x)/dx$$

TABLE 1

| | | Average Roughness |
|---|---|---|
| Terpene Composition Wash | (Inside Diameter) | 5.6 Ra |
| Acid Wash | (Inside Diameter) | 12.5 Ra |
| Terpene Composition Wash | (Outside Diameter) | 2.2 Ra |
| Acid Wash | (Outside Diameter) | 6.0 Ra |

Table 1 indicates that cans washed with the terpene composition produce a finish about two to three times smoother than cans washed in a standard acid wash.

EXAMPLE I

A metal container testing apparatus was provided in which an aluminum container is held in an upside-down orientation. One spray nozzle is directed at the top of the container and a second nozzle is directed at the bottom. A cleaning agent having the composition identified below in Table 2 is sprayed through both nozzles at an aluminum container having lubricants and coolants on it for a period of 55 seconds. The container is then rinsed in a first rinsing tank containing water with manual agitation. The container is then removed and placed in a second rinsing tank containing water with manual agitation. The container is then rinsed in a third rinsing tank containing water with manual agitation and subsequently dried. The total time rinsing was approximately 55 seconds.

TABLE 2

| Ingredient | Percentage by Volume |
|---|---|
| d-limonene | 22.28 |
| Tergitol NP-7 | 2.48 |
| WRS-1-66 | .03 |

TABLE 2-continued

| Ingredient | Percentage by Volume |
|---|---|
| Water | 75.21 |

A comparison of an aluminum container cleaned in this manner with an aluminum container cleaned by traditional acid cleaning process using an acid was comprising 37% by volume sulfuric and hydrofluoric acid with a surfactant mix can be seen in FIG. 1. Both containers were formed by an identical process and contained the same lubricants and coolants on their outer surfaces prior to cleaning. As can be seen, the container cleaned by the present process has a shiny, highly reflective surface, while the acid wash container has a much duller, smoky appearance.

EXAMPLE II

A comparative examination of the surface of aluminum containers cleaned by the present process and by a standard acid wash was conducted by taking electron micrographs of the metal container surfaces after washing.

Figure 2:
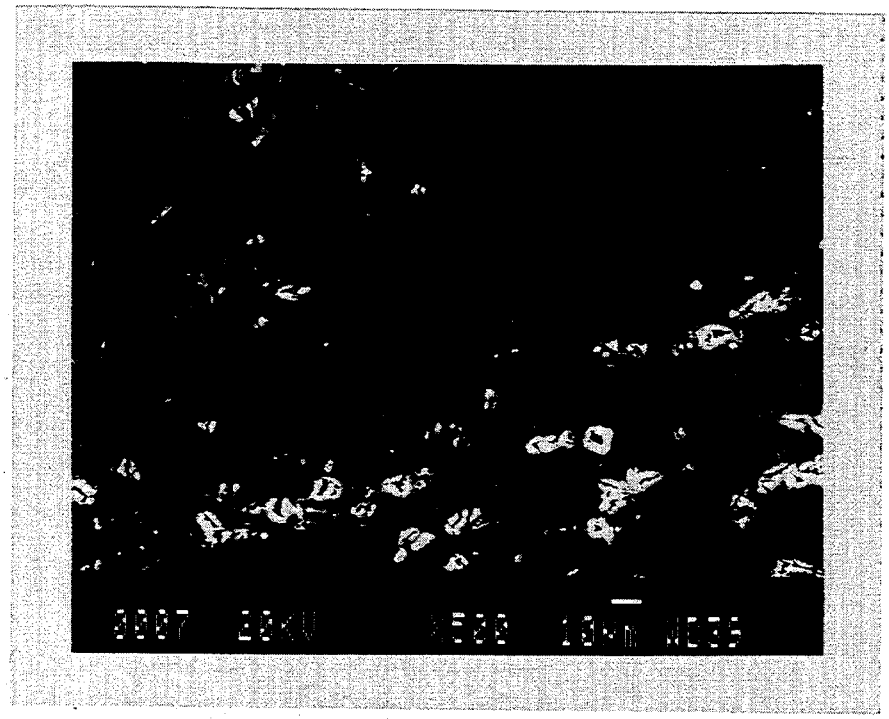
FIG. 2 is an electron micrograph of the surface of an aluminum container washed according to the present invention.
Figure 3:
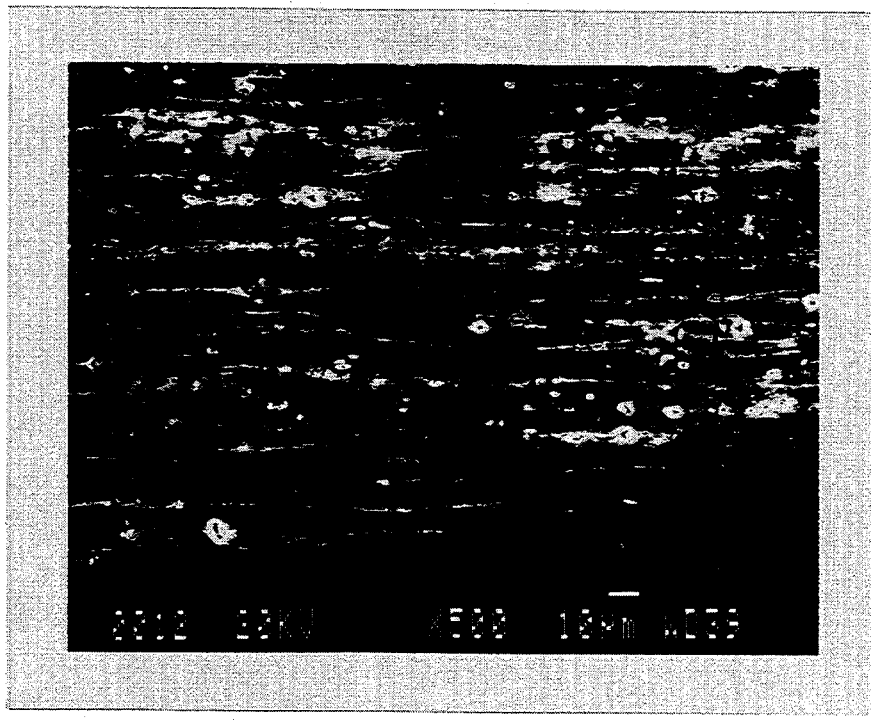
FIG. 3 is an electron micrograph of the surface of an aluminum container washed by a standard acid wash.

The container washed in accordance with the present invention was cleaned according to the process described in Example I. A resulting electron micrograph at magnification of 500× is shown in FIG. 2. A container washed by standard acid wash, as described in Example I is shown in FIG. 3. Comparisons of the containers cleaned by the present process and the acid wash shows that the container cleaned with a d-limonene cleaning agent has a much smoother surface, while the acid wash container has deeper pits and a scratched appearance. The difference in these surfaces accounts for many advantages of the present process, including a shiny appearance and better ink or paint adhesion.

EXAMPLE III

The effectiveness of a cleaning agent according to the present invention was compared with the effectiveness of a standard acid wash by identifying the number of containers that can be washed prior to the exhaustion of the cleaning solutions. The cleaning agent of the present invention was tested in two different compositions, Composition A and Composition B. Composition A was comprised of 89.1% d-limonene, 9.9% Tergitol NP-7 and 1.0% WRS-1-66; and Composition B was comprised of 93% d-limonene, 6.0% Tergitol NP-7 and 1.0% WRS-1-66. Tests were performed using different percentage concentrations of each of Compositions A and B.

Containers washed in accordance with the present invention and containers washed with the traditional acid cleaning wash as used in Example I, were cleaned in the manner as set forth in Example I. All containers were cleaned for 55 seconds and then rinsed in a series of three tap water immersion rinses followed by an immersion rinse in deionized water. The total time elapsed for the three tap water and one deionized water rinses was 110 seconds. The containers were then dried in an oven heated to 450° F.

Table 3 below sets forth the tested solutions in the percentage amounts tested:

TABLE 3

| % Composition | Composition (A/B) | # Cans | Reason for Stopping |
|---|---|---|---|
| 5 | A | 115 | Dirty cans |

TABLE 3-continued

| % Composition | Composition (A/B) | # Cans | Reason for Stopping |
|---|---|---|---|
| 5 | A | 110 | Dirty cans |
| 10 | A | 203 | Dirty cans |
| 10 | A | 196 | Dirty cans |
| 5 | B | 29 | Pump failure |
| 5 | B | 200 | Dirty cans |
| 5 | B | 211 | Dirty cans |
| 5 | B | 218 | Dirty cans |
| 5 | B | 205 | Dirty cans |
| 10 | B | 300 | Time constraint |
| 10 | B | 250 | Time constraint |
| 10 | B | 445 | Dirty cans |
| 15 | B | 200 | Time constraint |
| 15 | B | 215 | Time constraint |
| 15 | B | 200 | Time constraint |
| Standard Acid Cleaning Wash | | 100 | Dirty cans |

The notation "dirty cans" indicates that the test was stopped because the cleaning solution composition no longer effectively cleaned cans. The notation "time constraint" indicates that the test was stopped due to testing time limitations even though the cleaning composition was still effectively cleaning cans. The notation "pump failure" indicates that the test was stopped because the pump for spraying cleaning composition failed.

Comparisons of the number of containers able to be cleaned with a given amount of Compositions A and B and those containers cleaned by the same amount of standard acid wash shows that using Compositions A and B allowed for a greater number of containers to be cleaned before the cleaning solutions used no longer effectively cleaned the containers. Using Composition B, two to four times the number of containers could be cleaned than by use of the standard acid wash.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is

1. A method for cleaning manufacturing lubricants and coolants from metal containers during the manufacturing of metal containers comprising,
   a) cleaning manufacturing lubricants and coolants from said metal containers before said lubricants and coolants dry by contacting said containers with a terpene cleaning agent, said terpene cleaning agent having a pH of between about pH 6 and pH 9;
   b) whereby the surface of said containers cleaned in accordance with said method have a roughness average that is less than the roughness average of containers cleaned using an acidic or caustic cleaning agent.

2. A method as claimed in claim 1, wherein the pH of said cleaning agent is between about 6 and about 8.

3. A method as claimed in claim 1, wherein the pH of said cleaning agent is between about 6.5 and about 7.5.

4. A method as claimed in claim 1, wherein said cleaning agent comprises between about 3 percent by volume and about 37 percent by volume of said terpene.

5. A method as claimed in claim 1, wherein said cleaning agent comprises d-limonene, alpha-terpineol, beta-terpineol, alpha-pinene, beta-pinene, alcohols thereof or mixtures thereof.

6. A method as claimed in claim 1, wherein said cleaning agent comprises d-limonene.

7. A method as claimed in claim 1, wherein said step of cleaning further comprises contacting said container with a surfactant.

8. A method as claimed in claim 7, wherein said surfactant comprises nonylphenol, aklanolamide, (nonylphenoxy) polyethylene oxide, sodium salts of petroleum sulfonic acid, sorbitan sesquioleate or mixtures thereof.

9. A method as claimed in claim 1, further comprising rinsing said cleaning agent from said container with water.

10. A method as claimed in claim 9, further comprising recovering said terpene and said water.

11. A method as claimed in claim 10, further comprising separating said terpene from said water.

12. A method as claimed in claim 11, wherein said terpene comprises d-limonene, alpha-terpineol, beta-terpineol, alpha-pinene, beta-pinene, alcohols thereof or mixtures thereof.

13. A method as claimed in claim 11, wherein said terpene comprises d-limonene.

14. A method as claimed in claim 11, wherein said step of cleaning further comprises contacting said container with a surfactant.

15. A method as claimed in claim 11, wherein said rinsing water comprises said separated water.

16. A method as claimed in claim 1, wherein said metal container comprises aluminum, steel or alloys thereof.

17. A method as claimed in claim 1, wherein said metal container comprises aluminum.

18. A method as claimed in claim 1, wherein said container is a beer, beverage or food container.

19. A method as claimed in claim 1, wherein said metal is aluminum.

20. A method as claimed in claim 19, wherein said cleaning agent comprises d-limonene, alpha-terpineol, beta-terpineol, alpha-pinene, beta-pinene, alcohols thereof or mixtures thereof.

21. A method as claimed in claim 19, wherein said contacting comprises spraying said metal surface with said cleaning agent.

22. A method as claimed in claim 19, further comprising separating said cleaning agent from said lubricants and coolants.

23. A method as set forth in claim 1, wherein said cleaned containers are more reflective than containers cleaned with an acidic or caustic finishing agent.

24. The method as set forth in claim 1, wherein said cleaned containers are at least twice as smooth as containers cleaned with an acid wash.

25. The method as set forth in claim 1, wherein the outside diameter surface of said containers have a roughness average of less than about 5 Ra.

26. The method as set forth in claim 1, wherein the surface of said containers cleaned in accordance with said method have a roughness average of less than about 12.5 Ra on their inside diameters.

27. The method as set forth in claim 1, wherein the outside surfaces of said containers cleaned in accordance with said method have a roughness average of below about 6.0 Ra.

28. The method as set forth in claim 1, wherein the surfaces of said containers cleaned in accordance with said method have a roughness average of below about 5.6 Ra.

29. The method as set forth in claim 1, wherein said cleaned containers have a smoother surface than containers cleaned with a wash that does not have a substantially neutral pH as determined from a comparison of electromicrographs of cleaned containers.

30. The method as set forth in claim 1, wherein said containers cleaned in accordance with the present method have a shinier appearance than containers cleaned with an acidic or caustic cleaning agent.

31. The method as set forth in claim 1, wherein said containers cleaned in accordance with said method have better ink and paint adhesion characteristics.

32. A method for cleaning metal containers during the manufacture of metal containers, comprising contacting a metal container with a cleaning agent comprising a terpene in an amount between about 2 percent and about 40 percent by volume to remove lubricants and coolants from said metal containers before said lubricants and coolants dry and rinsing said container with water to obtain a container having a roughness average below about 5 Ra as measured on the outside diameter of said metal container.

33. A method for cleaning metal containers, comprising
(a) contacting metal containers with a terpene cleaning agent having a pH of from about 6 to about 9 to clean lubricants and coolants before said lubricants and coolants dry, said cleaning agent being effective to remove said lubricants and coolants deposited on said containers;
(b) rinsing said cleaning agent and said lubricants and coolants from said containers with water, said rinsed containers having a roughness average of less than about 12.5 Ra on their inside diameters;
(c) recovering said cleaning agent, lubricants and coolants, and water;
(d) separating said cleaning agent, lubricants and coolants, and water;
(e) reusing said cleaning agent and water in said method.

34. A method for reducing etching and gouging of metal containers during the cleaning of said containers, comprising:
(a) contacting metal containers with a d-limonene based cleaning agent in an amount between about 2 percent and about 40 percent by weight d-limonene to remove lubricants and coolants deposited on said containers before said lubricants and coolants dry;
(b) rinsing said containers with water to remove said cleaning agent and said lubricants and coolants, said step of rinsing conducted in a series of stages wherein water is sprayed through spray heads and is thereafter collected in reservoirs available for reuse in said method;
(c) whereby said contacting of said containers with said cleaning agent and said rinsing of said containers is conducted in a manner that does not cause said containers to be etched or gouged and provides containers having a roughness average below about 5 Ra as measured on the outside diameter of said metal containers.

* * * * *

UNITED STATES PATENT AND TRADEMARK OFFICE
CERTIFICATE OF CORRECTION

PATENT NO. : 5,421,899
DATED : June 6, 1995
INVENTOR(S) : Hamilton et al.

It is certified that error appears in the above-indentified patent and that said Letters Patent is hereby corrected as shown below:

On the title page, under item [*], change " Sep. 28, 2010" to --December 21, 2010--.

Signed and Sealed this

Twenty-sixth Day of September, 1995

Attest:

BRUCE LEHMAN

*Attesting Officer*     *Commissioner of Patents and Trademarks*